United States Patent
Thiel et al.

(10) Patent No.: US 9,222,467 B2
(45) Date of Patent: Dec. 29, 2015

(54) TRANSMISSION DEVICE FOR A WIND TURBINE

(75) Inventors: Enrico Thiel, Rostock (DE); Reinhard Vilbrandt, Rostock (DE)

(73) Assignee: Suzion Energy GmbH, Rostock (DE)

( * ) Notice: Subject to any disclaimer, the term of this patent is extended or adjusted under 35 U.S.C. 154(b) by 936 days.

(21) Appl. No.: 13/265,434

(22) PCT Filed: Apr. 20, 2010

(86) PCT No.: PCT/EP2010/002411
§ 371 (c)(1),
(2), (4) Date: Oct. 20, 2011

(87) PCT Pub. No.: WO2010/121786
PCT Pub. Date: Oct. 28, 2010

(65) Prior Publication Data
US 2012/0039011 A1    Feb. 16, 2012

(30) Foreign Application Priority Data
Apr. 20, 2009   (DE) .......................... 10 2009 017 824

(51) Int. Cl.
| | |
|---|---|
| *H05F 3/02* | (2006.01) |
| *F03D 11/00* | (2006.01) |
| *H05F 3/04* | (2006.01) |

(52) U.S. Cl.
CPC ............ *F03D 11/00* (2013.01); *F03D 11/0033* (2013.01); *H05F 3/02* (2013.01); *H05F 3/04* (2013.01); *Y02E 10/722* (2013.01)

(58) Field of Classification Search
USPC ....................................................... 361/220
See application file for complete search history.

(56) References Cited

U.S. PATENT DOCUMENTS

| | | | | |
|---|---|---|---|---|
| 7,377,750 | B1 * | 5/2008 | Costin et al. ............... | 416/146 R |
| 7,502,215 | B2 * | 3/2009 | Krug et al. ..................... | 361/220 |
| 2003/0170122 | A1 * | 9/2003 | Wobben ................. | F03D 1/065 |
| | | | | 416/31 |

(Continued)

FOREIGN PATENT DOCUMENTS

| | | |
|---|---|---|
| DE | 10 2004 012 946 A1 | 10/2005 |
| DE | 10 2004 022 299 A1 | 12/2005 |
| DE | 10 2006 009 127 A1 | 9/2007 |
| EP | 0 718 495 A1 | 6/1996 |

(Continued)

OTHER PUBLICATIONS

International Search Report dated Apr. 21, 2011.

*Primary Examiner* — Stephen W Jackson
*Assistant Examiner* — Ann Hoang
(74) *Attorney, Agent, or Firm* — Norris McLaughlin & Marcus, P.A.

(57) ABSTRACT

The invention relates to a transmission device for a wind turbine, having a holder, a sliding contact device having pressing means, and at least one electrode having adjustment means for transmitting lightning current. The electrode can form a spark gab having a sparking distance S together with a ring electrode, wherein the ring electrode can be arranged on the rotary device, or can be connected to a grounding device that cannot be rotated with respect to the rotary device. To improve the transmission, the holder is rotationally fixed arranged on the rotary device, or arranged in a non rotatable manner with respect to the grounding device. Furthermore, the electrode is arranged in a movable manner relative to the holder by means of a tracking device having support means. The electrode is supported by way of the supporting means relative to the rotary device or the ring electrode such that the sparking distance S can not fall below a minimum dimension.

14 Claims, 3 Drawing Sheets

(56) References Cited

U.S. PATENT DOCUMENTS

2004/0264082 A1  12/2004  Suliman et al.
2007/0009361 A1*  1/2007  Moller Larsen ........ F03D 11/00
                                                                      416/146 R
2009/0174186 A1  7/2009  Nyborg
2013/0100570 A1*  4/2013  Lyngby ............... F03D 11/0033
                                                                      361/117

FOREIGN PATENT DOCUMENTS

| EP | 0 754 624 A1 | 1/1997 |
| EP | 1 522 725 A2 | 4/2005 |
| EP | 1 568 883 A2 | 8/2005 |
| EP | 156 8883 A2 | 8/2005 |
| EP | 1 863 162 A2 | 12/2007 |
| WO | 2009/076968 A2 | 6/2009 |

* cited by examiner

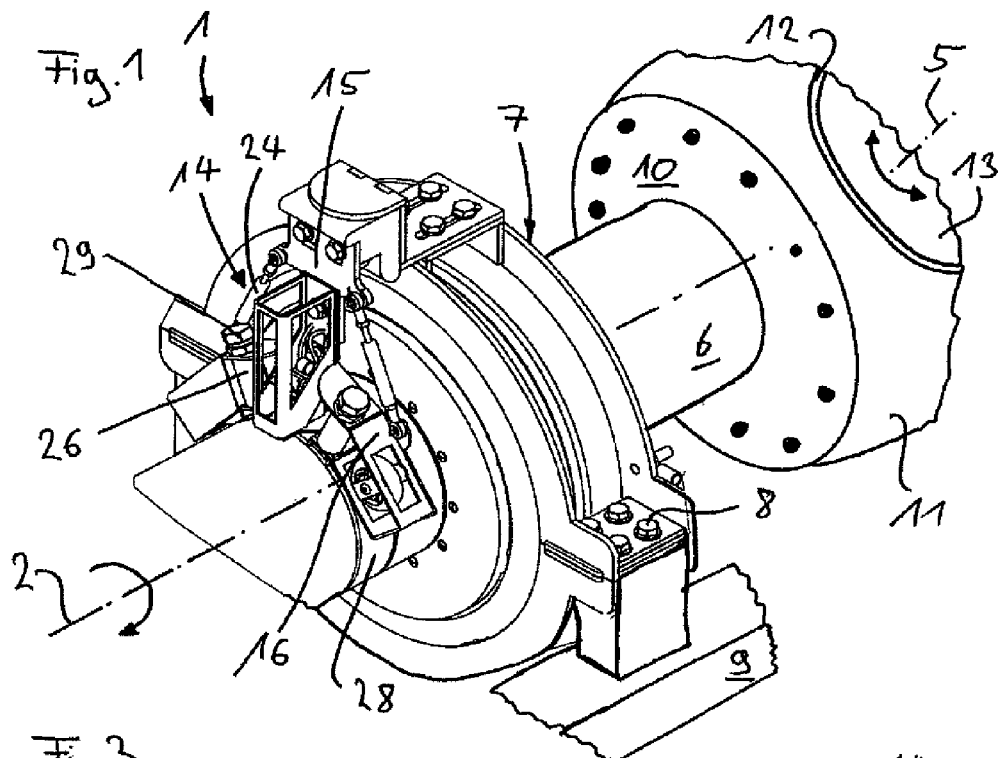
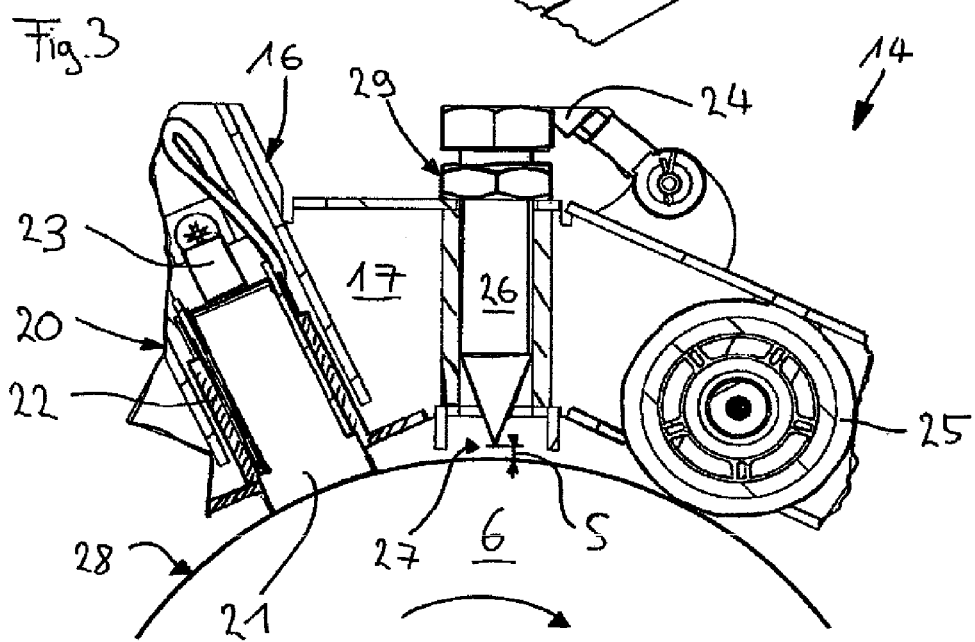

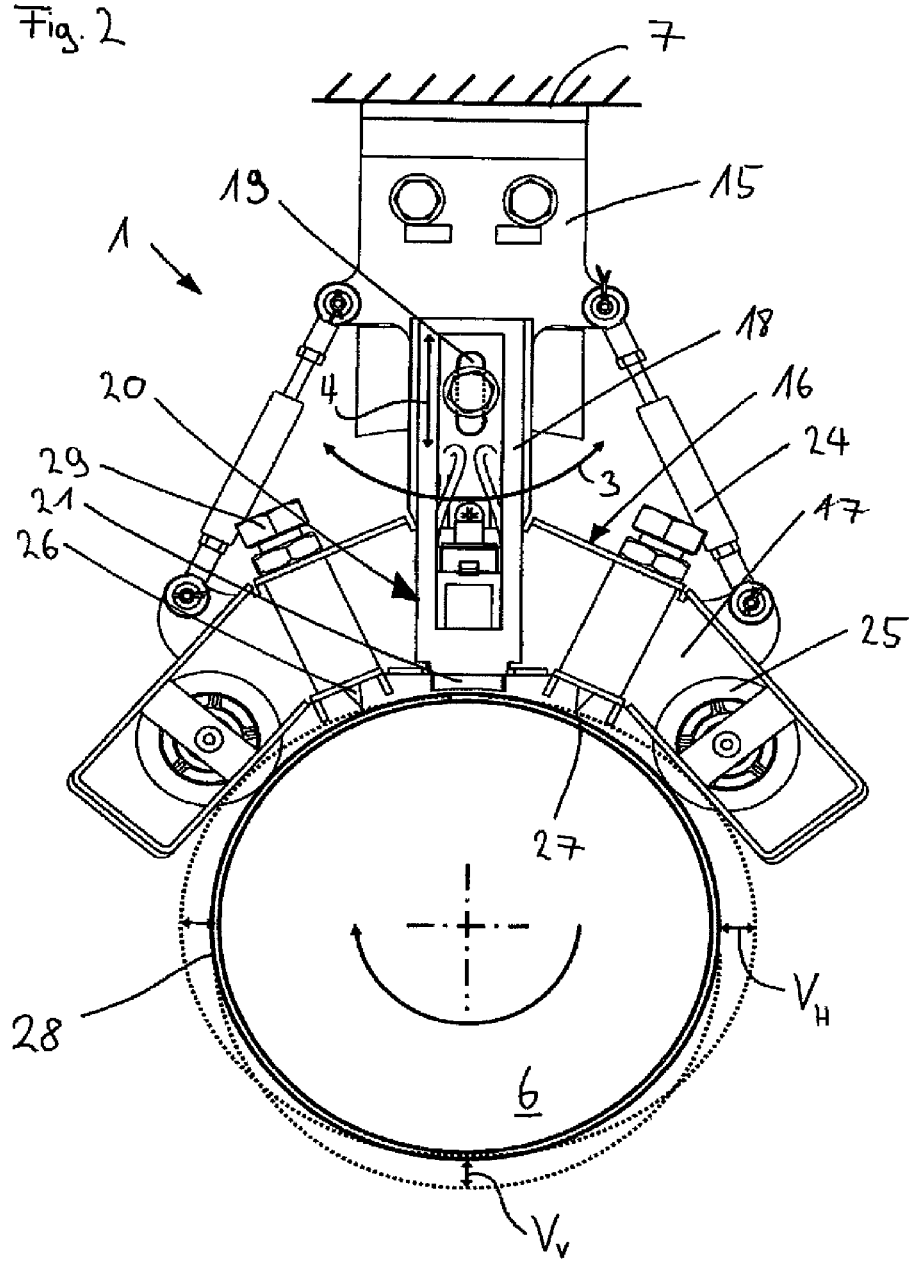

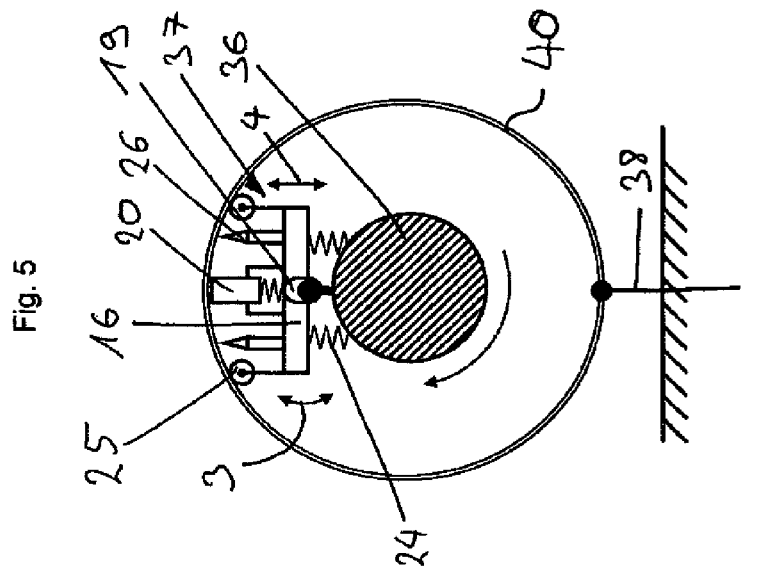
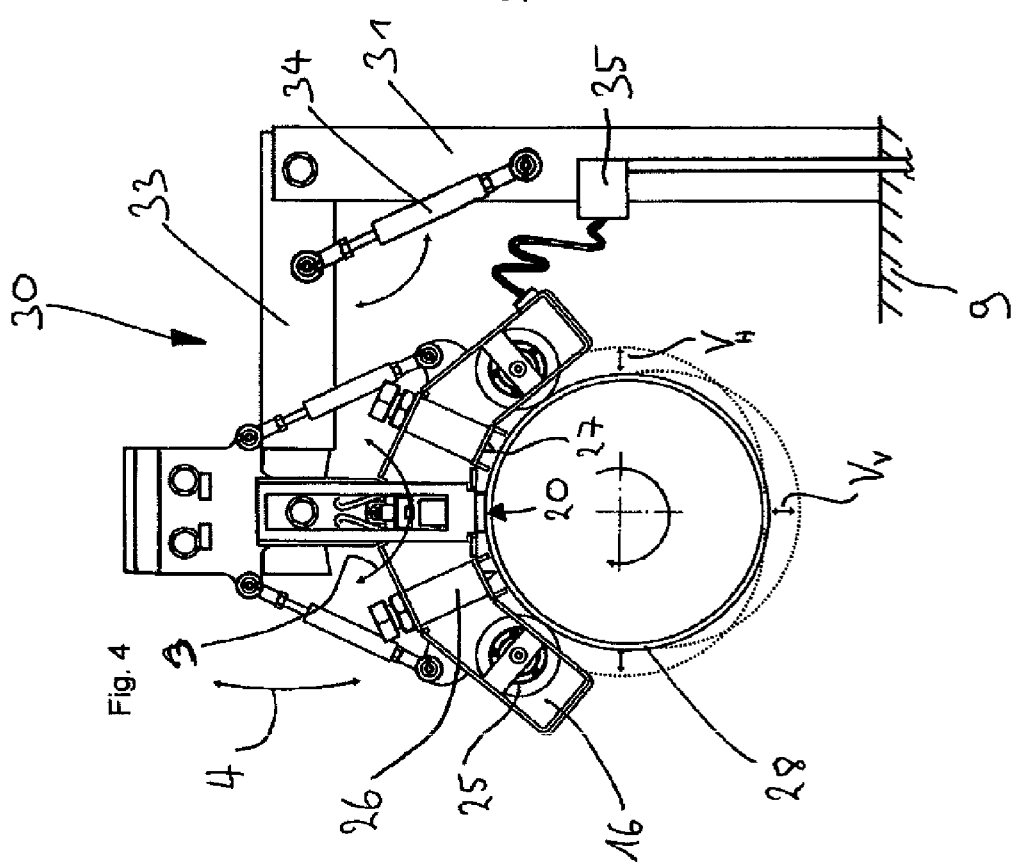

TRANSMISSION DEVICE FOR A WIND TURBINE

This application is a 371 of PCT/EP2010/002411 filed Apr. 20, 2010, which claims foreign priority benefit under 35 U.S.C. §119 of German application 10 2009 017 824.4 filed Apr. 20, 2009.

TECHNICAL FIELD

The invention relates to a transmission device for a wind turbine. Such transmission devices are used to transfer or to discharge electrostatic energy between a rotatable rotary device and a grounding device that cannot be rotated with respect to the rotary device. Hereby, the transmission device comprises a holder, a sliding contact device having pressing means, and at least one electrode having adjustment means for transmitting lightning current.

The electrode can form a spark gab having a sparking distance S together with a ring electrode, wherein the ring electrode can be arranged on the rotary device, or can be connected to a grounding device that cannot be rotated with respect to the rotary device. Such transmission devices are used to prevent electrostatic charging of the rotor shaft, the rotor hub and rotor blades with respect to the nacelle of the wind turbine. Thereby this would cause damage to electronic components in the hub, or the maintenance personnel could be exposed to an electric shock. On the other hand, in case of a lightning strike to the rotor, the lightning current is diverted via the transmission device directly to a grounding device. Thereby, electrical components in the nacelle and particularly the bearing of the rotor shaft will be protected from being damaged by lightning.

BACKGROUNDS

DE 10 2004 012 946 A1 discloses a wind turbine having a device for continuously discharging electrostatic energy between the rotor shaft and the machine frame of the nacelle. Here on the rotor shaft, a ring electrode is arranged, which produces a permanent electric connection between the rotor shaft and the ground in conjunction with a sliding contact device. Therefore, no charging of the rotor of the wind turbine can take place. Furthermore, in addition to the sliding contact device, an electrode is provided on the machine frame, which forms a spark gap together with the ring electrode. With the help thereof, the high-energy lightning current can be transmitted from the rotor shaft into the machine frame.

This design has following serious disadvantage that the lightning current transmission does not function reliably, and thus the aforementioned components are still exposed to a risk of damage. The reason for this lies in that the relative position of the rotor shaft with respect to the machine frame varies during operation, caused by the tolerance of the bearings and/or deformation of the shaft due to load changes. This results in that the sparking distance S of the spark gap varies significantly, sometimes up to five millimeters. If the spark gap is too large, then a lightning current would choose a path with least resistance, e.g., through the rotor bearings. It is also conceivable that the electrode touches the ring electrode, which can result in wearing or welding during a lightning current flow.

SUMMARY OF INVENTION

An object of the invention is to provide an improved transmission device for a wind turbine, which among others, avoids the disadvantages of the prior art. In particular, here the reliability and durability of the transmission device can be increased.

According to the invention, the object is solved by the features of independent claim 1, wherein the holder is rotationally fixed arranged on the rotary device, or arranged to be not rotatable with respect to the grounding device, and furthermore the electrode is arranged in a movable manner relative to the holder by means of a tracking device having support means. The electrode is supported by the supporting means relative to the rotary device or the ring electrode in such a way that the sparking distance S can not fall below a minimum dimension. The movability of the bearing of the electrode and the tracking, oriented to the rotary device or to the grounding device, allows that the electrode essentially also performs the movement of the rotary device. Therefore, the relative position of the electrode relative to the ring electrode is constant or the minimal dimension of the sparking distance is never exceeded. Thereby, it is effectively prevented that the electrode touches the ring electrode on the rotary device.

If the holder is arranged non-rotatable relative to the grounding device, then the holder and the grounding device can well perform pivot-rotation or partial rotation relative to each other, though no full- or multiple-rotation of the two parts relative to each other is possible.

A preferred embodiment of the invention teaches that the tracking device comprises prestressing means arranged to work between the holder and supporting means. Therefore, the supporting means always prestressed lies against the rotating device and/or the ring electrode. This cause the striking distance S not to exceed a maximum amount. Therefore, for the first time this embodiment of the invention allows the spark gap to have an adjustable constant gap distance S, essentially independent of movements of the rotary device, whereby the transmission of lightning currents is ensured and the bearings or other components are protected from damage caused by the lightning current flow. This described positive effect is particularly effectively produced in such a manner that the electrode is arranged to be pivotable and movable relative to the holder.

Furthermore, the tracking device comprises a carrier which is movably arranged on the holder and holds the electrode and the supporting means. Hereby, the tracking device forms a compact unit which can be mounted on the holder. Hereby, it would be advantageous if the prestressing means are arranged on the holder and the carrier, and the carrier holds the sliding contact device.

By means that the sliding contact device and the electrode act upon the same ring electrode, the component complexity is further reduced.

A particularly advantageous development of the invention discloses that the supporting means are formed as at least one roller mounted on the carrier. Due to the movement of the rotary device or the ring electrode with respect to the supporting means, these are subject to friction-related wear. This results in that the sparking distance S of the spark gab decreases with continuous operation of the transmission device. Through the use of rollers, the wear of the supporting means can be greatly reduced, through which it may lead less to the described reduction of the sparking distance S.

The described invention shows particularly clearly its potential for improving the prior art, when the transmission device is used for the rotor shaft of a wind turbine. Here the rotary device is designed as a rotor shaft, wherein the rotor shaft also includes the ring electrode. For example, the ring electrode can be formed in one piece with the rotor shaft, e.g.

by being screwed into the rotor shaft. It is also advantageous if a separate ring electrode is mounted on the rotor shaft that is connected to lightning conductor from the hub of the wind turbine. A separate ring electrode has the advantage that it can be easily replaced when it is worn, and can also be made from particularly favorable material for forming an electric flashover across the spark gap. The holder of the transmission device here is fixedly mounted with respect to the machine frame of the wind turbine, wherein the electrode and/or the sliding contact device are connected to the grounding device. The grounding device can be represented to be integrated by the holder and its fixing. A separate grounding device can also be provided, which prevents lightning current flowing excessively through the machine frame. Thus, electromagnetic effects are reduced.

A preferred embodiment of the invention teaches to arrange the holder directly on the main bearing of the rotor shaft. In this way a particularly compact and lightweight arrangement of the transmission device can be realized.

An alternative embodiment discloses an inversely similar arrangement, wherein here the rotary device is also formed as the rotor shaft of a wind turbine. In contrast to the above mentioned configuration, now the holder is arranged on the rotor shaft. The ring electrode is rotationally fixed arranged with respect to the machine frame and surrounds the rotor shaft. Thus, the transmission- and tracking device rotates together with the rotor shaft, and in this way produces the spark gap with the fixed ring electrode which is connected to the grounding device.

An alternative embodiment of the invention states that the rotary device is a nacelle or a machine frame of a wind turbine, wherein the nacelle is rotatably mounted on a fixed tower. The rotatability of the nacelle realizes the wind tracking, also known as "yawing", wherein the nacelle rotates around a substantially vertical rotation axis in the horizontal plane in such a way, that the wind flows perpendicularly against a rotation plane of the rotor, and thus the energy yield is maximized.

In a first configuration of the foregoing embodiment, the holder of the transmission device is arranged on the nacelle or on the machine frame with the tacking device. The electrode of the transmission device here can form the spark gab with the ring electrode in such a way that the ring electrode is provided on the tower and connected to the grounding device. Thus, the tower is acted upon via the ring electrode by the tracking device, wherein the transmission device can rotate around the tower. The grounding device is fixedly provided on the tower.

A second configuration of the foregoing embodiment teaches that the ring electrode is provided on the machine frame or on the nacelle and can rotate around the tower with the nacelle. The holder of the transmission device, however, is arranged on the tower and supports via the tracking device, at least the electrode which is connected to the grounding device.

These two configurations of the alternative embodiment for the first time allow a lightning current to be conducted safely and directly from the nacelle into the tower and into the grounding device.

Another not shown embodiment of the invention states that the rotary device is designed as a rotor blade of a wind turbine with a ring electrode and the electrode and/or the sliding contact device are connected to the grounding device. The rotor blade can rotate around its pitch axis with respect to the hub of the rotor, whereby the inflow angle of the rotor blade relative to the wind is changeable. The holder of the transmission device here can be arranged on the hub of the rotor, wherein the electrode forms the spark gap with the ring electrode on the rotor blade. The tracking device here makes sure that the sparking distance of the spark gap is kept constant, even when the rotor blade performs at the transmission position a movement relative to the hub, which goes beyond the rotation. In this way, a lightning current can be safely transmitted from the rotor blade to the grounding device.

The invention also includes a wind turbine with a transmission device according to the above described embodiments and configurations. Here, the described features can also be partially or fully achieved, whereby the invention should not be limited.

BRIEF DESCRIPTION OF THE DRAWINGS

Further details of the invention are apparent from the drawings according to description. In the drawings shows FIG. 1 an isometric view of a transmission device according to a first embodiment, mounted on a main bearing of a rotor shaft of a wind turbine, FIG. 2 a plan view of the transmission device according to FIG. 1, FIG. 3 a partial section through the transmission device according to FIG. 1, FIG. 4 a plan view of a further embodiment of the transmission device, and FIG. 5 a principle diagram of an alternate embodiment of the transmission device.

PREFERRED EMBODIMENTS

A first embodiment of the invention is illustrated in FIGS. 1 to 3. The connection of the transmission device 1 in the wind turbine should be explained via FIG. 1, whereto a rotor shaft 6 and an associated main bearing 7 are partly shown. The main bearing 7 is fixed in the not shown nacelle of the wind turbine via connecting means 8 on a machine frame 9.

The rotor flange 10, on which the rotor hub 11 is screwed on, is located at one from the machine frame 9 protruding end of the rotor shaft 6. Blade bearings 12, which support the rotor blades 13 to rotate about the pitch axis 5, are arranged on the rotor hub 11. Thereby, the inflow angle of the rotor blades 13 can be adjusted by means of a drive device in order to make the power output of the wind turbine adapt to the power requirements of the electricity supply system. Furthermore, with the help of this so-called pitch control of rotor blades 13, the mechanical loads are reduced.

The rotor shaft 6 is supported to be rotatable about a rotor axis 2, wherein the axial and radial forces are mainly absorbed by the main bearing 7 and transmitted into the machine frame 9. The main bearing 7 can be configured as spherical roller bearings. The radial and axial references used below always orients on the rotor axis 2. A not shown gearing is connected to the end of the rotor shaft 6 far away from the rotor hub 11, into which the rotational energy is transmitted with a high torque. The gearing reduces the rotary torque under increasing of the rotational velocity and transfers the rotational energy into a generator. The rotor shaft 6, the main bearing 7 and the gearing are assembled as a pre-assembly in one piece on the machine frame 9. In addition to the main bearing 7, the support of the described assembly is implemented by means of two supporting struts of the gearing. The conversion of the rotational energy requires that the gearing must support the high input rotary torque onto the machine frame 9. The supporting struts and the main bearing 7 must transmit tremendous forces, especially when there are fluctuations of the moment, for example, caused by strong wind gusts. The rotor shaft 6 here can experience load-induced deformations of up to five millimeters and displacements to the extent of the bearing clearance.

The machine frame 9 is screwed with another not illustrated carrier portion on flanges and here includes a facing to the tower, underneath lying annular flange, which lies on the annular ring of an azimuth bearing of the wind turbine and is connected to the tower via this. The azimuth bearing enables the horizontal alignment of the nacelle of the wind turbine according to the wind direction, the so-called wind direction tracking of the wind turbine. For automatic rotation of the nacelle about the tower, one or more azimuth drives, which are torque-proof connected to the machine frame 9 of the nacelle, are provided on the azimuth bearing. Here, the azimuth bearings must transmit the arising bearing forces, such as thrust-, centrifugal- and yawing forces from the machine frame 9 of the nacelle into the tower.

It can be seen from the FIG. 1 that the transmission device 1 is arranged with the holder 15 on the main bearing 7. The exact arrangement of the transmission device 1 can be seen from FIG. 2 and in detail in FIG. 3. The transmission device 1 comprises the holder 15 and the tracking device 14 which is movably arranged thereon. While the holder 15 is fixedly connected to the main bearing 7, so the tracking device 14 can move together with the rotor shaft 6 in a certain extent.

The tracking device 14 comprises a carrier 16, prestressing device 24 implemented as springs 24, and rollers 25, wherein two electrodes 26 and a sliding contact device 20 are received by the carrier. As shown in FIG. 2, the carrier 16 is T-shaped, wherein this includes a crossbeam 17 curved corresponding to the rotor shaft curvature, which surrounds the rotor shaft 6, at least in part. The trunk 18 of the T-carrier 16 receives the sliding contact device 20 and a fixing device, by which the carrier 16 of the tracking device 14 is fixed on the holder 15 to be pivotable not only in a pivot direction 3 or parallel to the rotor axis 2 but also movably in a radial direction 4. The fixing device can be provided as an elongated hole 19 in the carrier 16, whereby a movement is possible in the radial direction 4. Furthermore, an elongated hole in the holder is also conceivable or the fixing device can be configured as a in radial direction 4 movable sledge construction. The tracking device 14 is supported by the rollers 25 and by means of the springs 24 in the way of being prestressed relative to the rotor shaft 6. The springs 24—here pneumatic springs—are fixed on the holder 15 and on the crossbeam 17 of the T-carrier 16.

The movable arrangement of the transmission device 1 causes that the carrier 16, and thus also the electrodes 26 and the sliding contact device 20 participate in the arising horizontal and vertical displacements $V_H$ and $V_V$ of the rotor shaft 6. If the outer surface of the rotor shaft 6 experiences a horizontal displacement $V_H$, then the prestressed bearing of the carrier 16 causes an associated motion of the carrier 16 in the pivot direction 3. By a vertical displacement $V_V$, the carrier 16 moves with the rotor shaft 6 in the radial direction 4. Through the possibilities of movement in the pivot direction 3 or radial direction 4, the tracking device 14 is able to compensate all displacements $V_H$ and $V_V$, and thus always ensure a constant gap width S of the spark gap 27.

FIG. 3 shows a section of the carrier 16 with an electrode 26 and the sliding contact device 20 in cooperation with the rotor shaft 6. The sliding contact device 20 here comprises a carbon brush 21, which is movably arranged in a sleeve 22 with pressing means 23. A ring electrode 28, which is permanently acted upon by the carbon brush 21 as being prestressed through the pressing means formed as coil spring 23, is arranged on the rotor shaft 6. Since the carbon brush 21 is connected to a grounding device, it is so effectively prevented that it leads to charging of the rotor, i.e. the rotor shaft 6, the rotor hub 11 and the rotor blades 13, because a substantially permanent electric contact between the ring electrode 28 and the grounding device exists via the sliding contact device 20. Advantageously, the ring electrode 28 on the rotor shaft 6 is further electrically connected to the rotor hub 11 and, when necessary, to rotor blades 13.

As the sliding contact device 20 is not suitable to transmit excessively high currents, such as lightning currents, the electrodes 26 which forms together with the ring electrode 40 the spark gap 27 with the sparking distance S are provided in the carrier 16. Since the dimension of the parking distance S is essential for the function of lightning current transmission, this must be kept constant by the above mentioned tracking device 14. Because if at the time when a lightning strike into the rotor of the wind turbine, the sparking distance S and thus the electric resistance of the spark gap would be excessively large due to deformation or displacement, then the lightning current will chose an alternative derivation path and could thereby destroy components of the wind turbine. Furthermore, each electrode 25 is arranged via adjusting means 29 in the carrier 16, in order to be able to adjust the sparking distance S and readjust the supporting means or the rollers 25 when they are worn. In the above-mentioned embodiment, the carrier 16 and the holder 15 take the function of the grounding device. This is however not absolutely necessary, but a separate grounding device 35 according to the embodiment described below also can be used.

FIG. 4 shows a further configuration of the above-described embodiment, wherein same features have the same reference signs as in FIG. 1-3. The transmission device 1' differs in the tracking device 30, the holder 31, the fixing device 33 and the grounding device 35. The holder 31 of the transmission device 1' is now no longer provided on the main bearing, but is formed as stander 31 and is directly fixed on the machine frame 9. The fixing device 33 between the holder 31 and the carrier 16 comprises a pivot arm 33 which is pivotally mounted on the holder 31. The pivot arm 33 allows the movability of the carrier 16 in the radial direction 4. Thus, in contrast to FIGS. 1-3, during a vertical displacement $V_V$ of the rotor shaft 6 the carrier 16 moves with the pivot arm 33. A spring 34, which provides a prestressed contact between the supporting means 25 of the carrier 16 and the rotor shaft 6, is provided between the holder 31 and the pivot arm 33.

The derivation of electrostatic charges or of lightning currents from the transmission device 1' is implemented via the separate grounding device 35. This is connected to the electrodes 26 of the sliding contact device 20.

An alternative embodiment of the transmission device is schematically illustrated by means of FIG. 5. Here, a rotatable rotary device 36, a ring electrode 40 rotationally fixed to the rotary device, a grounding device 38 and a transmission device 1'' working therebetween are given. The transmission device 1'' comprises, similarly to the above, a carrier 16, electrodes 26 arranged thereon and a sliding contact device 20. The carrier 16 is in pivot direction 3 and in radial direction 4 movably fixed to a holder 39 on the rotary device 36 via a tracking device 30. Thus, the transmission device 1'' rotates together with the rotary device 36. The ring electrode 40 is fixed. The function of tracking device 1'' is similar to FIGS. 1-3. This is conceivable, when the ring electrode is arranged on a tower of a wind turbine and the transmission device on the nacelle, wherein the transmission device rotates around the tower.

The feature combinations disclosed in the described embodiments should not have limiting effects on the invention, but the features of different embodiments are also combined with each other.

LIST OF REFERENCES

1 Transmission device
1' Transmission device
1" Transmission device
2 Rolor axis
3 Pivot direction
4 Radial direction
5 Pitch axis
6 Rotor shaft
7 Main bearing
8 Connecting means
9 Machine frame
10 Rotor flange
11 Rotor hub
12 Blade bearing
13 Rotor blade
14 Tracking device
15 Holder
16 Carrier
17 Crossbeam
18 Trunk
19 Elongated bore
20 Sliding contact device
21 Carbon brush
22 Sleeve
23 Coil spring
24 Springs
25 Roller
26 Electrode
27 Spark gap
28 King electrode
29 Adjusting means
30 Tracking device
31 Holder
32 Transmission device
33 Pivot arm
34 Spring
35 Transmission device
36 Rotary device
37 Spring
38 Grounding device
39 Holder
40 Ring electrode
$X_H$ Displacement
$X_V$ Displacement
S Gap width

The invention claimed is:

1. A transmission device for a wind turbine for transferring electrostatic energy between a rotatable rotary device and a grounding device that cannot be rotated with respect to the rotary device, the transmission device comprising
a holder, a sliding contact device with pressing means, and at least one electrode with adjusting means to transmit lightning current,
wherein a spark gap with a sparking distance S is formable between the at least one electrode and a ring electrode, and wherein the sliding contact device permanently acts upon the ring electrode,
wherein
the holder is arranged in a non-rotatable manner relative to the grounding device or in a manner of being rotationally fixed on the rotary device,
the transmission device comprises a tracking device with supporting means, wherein the tracking device is effectively arranged between the ring electrode and the at least one electrode,
wherein the ring electrode or the at least one electrode is connected to the rotary device in a manner of being rotationally fixed,
wherein the at least one electrode is arranged in a movable manner relative to the holder via the tracking device,
and wherein the at least one electrode is supported relative to at least one of the rotary device and the ring electrode by the supporting means in such a way that the sparking distance S does not fall below a minimal dimension.

2. The transmission device according to claim 1, wherein the tracking device comprises prestressing means, which are effectively arranged between the holder and the supporting means, so that the supporting means always lies against at least one of the rotary device and the ring electrode in a manner of being prestressed, and so the sparking distance S cannot exceed a maximum dimension.

3. The transmission device according to claim 1, wherein the at least one electrode is pivotally and movably arranged relative to the holder.

4. The transmission device according to claim 1, wherein the tracking device comprises a carrier, which is movably arranged on the holder and receives the at least one electrode and the supporting means.

5. The transmission device according to claim 4, wherein the prestressing means are arranged on the holder and on the carrier, and the carrier receives the sliding contact device.

6. The transmission device according to claim 1, wherein the supporting means are formed as at least one roller supported on the carrier.

7. The transmission device according to claim 1, wherein the rotary device is designed as a rotor shaft of a wind turbine with a ring electrode, and at least one of the at least one electrode and the sliding contact device is connected to the grounding device.

8. The transmission device according to claim 7, wherein the holder is arranged on a main bearing of the rotor shaft.

9. The transmission device according to claim 1, wherein the rotating device is designed as the rotor shaft of a wind turbine, wherein the holder is arranged on the rotor shaft, and the ring electrode torque-proof surrounds the rotor shaft and is connected to the grounding device.

10. The transmission device according to claim 1, wherein the rotary device is a nacelle of a wind turbine, wherein the holder is arranged on the nacelle, and the ring electrode is arranged on a tower of wind turbine and is connected to the grounding device.

11. The transmission device according to claim 1, wherein the rotary device is a nacelle of a wind turbine with a ring electrode, wherein the holder is arranged on a tower of a wind turbine and at least one of the at least one electrode and the sliding contact device are connected to the grounding device.

12. The transmission device according to claim 1, wherein the rotary device is designed as a rotor blade of a wind turbine with a ring electrode and at least one of the at least one electrode and the sliding contact device is connected to the grounding device.

13. A wind turbine comprising a rotatable rotary device and a grounding device that cannot be rotated with respect to the rotary device and a transmission device according to claim 1.

14. A transmission device for a wind turbine for transferring electrostatic energy between a rotatable rotary device and a grounding device that cannot be rotated with respect to the rotary device, the transmission device comprising
a holder, a sliding contact device with pressing means, and at least one electrode with adjusting means transmit lightning current, wherein a spark gap with a sparking distance S is formable between the at least one electrode and a ring electrode, wherein the holder is arranged in a non-rotatable manner relative to the grounding device or in a manner of being rotationally fixed on the rotary device, the transmission device comprises a tracking device with supporting means, the ring electrode or the at least one electrode is connected to the rotary device in a manner of being rotationally fixed, the at least one electrode is arranged in a moveable manner relative to the holder via the tracking device, the at least one electrode is supporter to at least one of the rotary device and the ring electrode by the supporting means in such a way that the sparking distance S does not fall below a minimal dimension, and the tracking device comprises prestressing means, which are effectively arranged between the holder and the supporting means, so that the supporting means always lies against at least one of the rotary device and the ring electrode in a maximum dimension.

\* \* \* \* \*